Dec. 12, 1933.   E. F. W. ALEXANDERSON   1,939,428
ELECTRIC VALVE CONVERTING SYSTEM
Filed May 9, 1933        3 Sheets-Sheet 1

Inventor:
Ernst F. W. Alexanderson,
by Charles E. Mullan
His Attorney.

Fig. 3

Dec. 12, 1933.　　E. F. W. ALEXANDERSON　　1,939,428
ELECTRIC VALVE CONVERTING SYSTEM
Filed May 9, 1933　　　3 Sheets-Sheet 3

Fig. 4.

Inventor:
Ernst F. W. Alexanderson,
by
His Attorney.

Patented Dec. 12, 1933

1,939,428

UNITED STATES PATENT OFFICE 1,939,428

ELECTRIC VALVE CONVERTING SYSTEM

Ernst F. W. Alexanderson, Schenectady, N. Y., assignor to General Electric Company, a corporation of New York Application May 9, 1933. Serial No. 670,125

21 Claims. (Cl. 172—237)

My invention relates to new and improved electric valve converting systems and, while my converting systems are of general application, they are particularly suitable for electric traction units, such for example, as electric locomotives.

There have heretofore been developed numerous types of electric valve converting apparatus for transmitting energy from a direct or alternating current supply circuit to an alternating current load circuit of constant or variable frequency, or to a single alternating current motor, which may be operated at constant or variable speed. When these previously developed systems have been applied to electric traction units, or to other installations having similar operating conditions, they have not been completely satisfactory under starting conditions, due primarily to the complexity and cost of the equipment necessary to provide a reduced voltage under starting and accelerating operations. Furthermore, in the case of electric locomotives or other installations utilizing motors whose speed must vary within wide limits, it has been found feasible to supply energy to these motors from an alternating current circuit through an electric valve frequency changing apparatus. This alternating current, the frequency of which may lie within a range from commercial frequencies to as high as several hundred cycles or so, may be derived from a generator driven by a prime mover. In the case of an electric locomotive, it has been proposed to mount a turbo-generator set directly on the locomotive for supplying the alternating current. Under certain conditions, however, it is desirable that this same converting apparatus should be capable of converting direct current into variable frequency alternating current for energizing the motor, as for example, when an electric locomotive normally operating from its prime mover, enters an electrified metropolitan terminal in which there are restrictions upon the operation of the boilers associated with the turbo-generator. Heretofore, there has not been proposed any electric valve converting system which may be readily changed over from alternating current to direct current operation.

It is an object of my invention, therefore, to provide a new and improved electric valve converting system which will overcome the above-mentioned short comings of the arrangements of the prior art and which will be simple and reliable in operation.

It is another object of my invention to provide an improved electric valve converting system which may be readily changed over from alternating current to direct current operation.

It is a further object of my invention to provide an improved electric valve converting system in which an electric translating apparatus such as a variable speed alternating current motor may be operated normally from an alternating current supply, but which may, under certain conditions be operated from an auxiliary source of direct current.

It is a still further object of my invention to provide a new and improved electric valve converting system for operating an electric translating apparatus, such as a variable speed alternating current motor, from a source of direct current and one which will satisfactorily start the apparatus from rest.

In accordance with one embodiment of my invention, an alternating current generator delivering current of a frequency within a range from commercial frequencies to as high as several hundred cycles or so, is driven by a prime mover. A variable frequency alternating current translating apparatus, such for example, as a variable speed alternating current motor, is interconnected with the alternating current supply circuit through a plurality of electric valves, the connections being such that in a portion of the system the current flows in the form of unidirectional current. Under normal operating conditions the unidirectional current circuit of the apparatus is either short circuited or connected in series with the field winding of the motor, in case a series characteristic is desired, while when it is desired to operate from the auxiliary source of direct current, this auxiliary source is connected in series in the unidirectional current circuit of the apparatus. Under these latter conditions, the alternating current generator may float on the line in the manner of a synchronous condenser to supply a commutating voltage for the electric valves and thus increase the reliability of operation of the variable speed motor.

In accordance with another feature of my invention, improved starting operation of such a system, energized from a direct current circuit, is obtained by deriving a relatively high frequency alternating current directly from the source of direct current through a relatively high frequency electric valve inverting apparatus in which the commutating electromotive force is provided either by a rotating synchronous machine or by commutating capacitors or a combination of the two. One or more other electric valve converting apparatus having their alternating current circuits inductively coupled with that of the inverting apparatus, are connected either to supply a common alternating current load circuit or separate alternating current load circuits. With such an arrangement only one of the inverting apparatus receives energy directly from the direct current circuit, while a portion of this energy is transmitted to the other inverting apparatus and thence to the load circuit through the inductive couplings of the converting apparatus. When it is desired to increase the amount of energy supplied to the translating apparatus the direct current source is connected in the unidirectional current circuit of one or more of the other converting apparatus so that they receive energy in parallel from the direct current source.

For a better understanding of my invention together with other and further objects thereof, reference is had to the following description taken in connection with the accompanying drawings, and its scope will be pointed out in the appended claims. Referring to the drawings, Fig. 3 illustrates a modified form of the arrangement of Fig. 2 which is particularly suitable for starting from a direct current supply circuit, while

Figure 1:
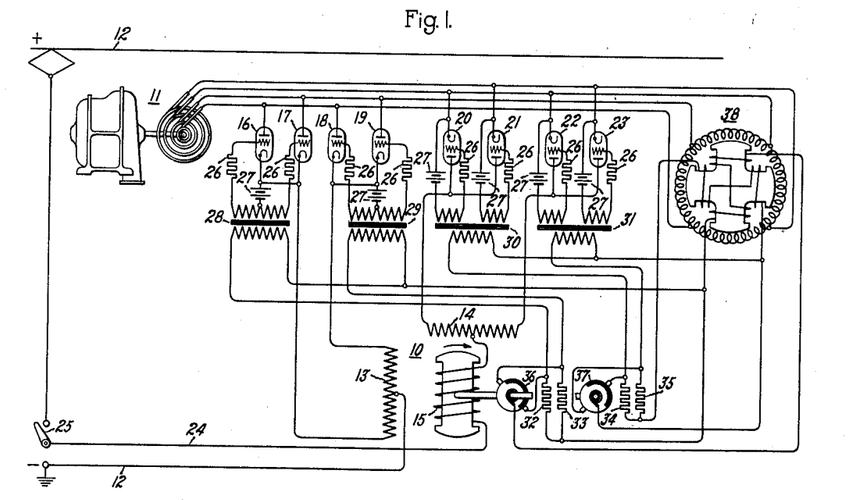
Fig. 1 illustrates an electric valve converting system embodying my invention for selectively energizing a variable speed alternating current motor from a turbo-alternator or from a direct current circuit.

Referring now more particularly to Fig. 1 of the drawings, there is illustrated an electric valve converting system for operating an alternating current traction motor 10 from either a quarter phase turbo-generator 11 or from a direct current trolley circuit 12. The motor 10 comprises a pair of bi-phase armature windings 13 and 14 and a rotating field or exciting winding 15. Two pairs of electric valves 16 and 17, and 18 and 19, are connected to transmit current from one phase of the turbo-generator 11 to the phase winding 13 of the motor 10, while two pairs of oppositely connected electric valves 20 and 21, and 22 and 23, are connected to return this current from the other phase winding 14 of the motor 10 to the other phase of the turbo-generator 11. The circuit for the motor current is completed through the switch device 25, when connected in its lower position, and the unidirectional current circuit 24. The electric valves 16–23, inc., are each provided with an anode, a cathode, and a control grid and may be of any of the several types well known in the art, although I prefer to use valves of the vapor electric discharge type.

In order to control the conductivity of the electric valves 16–23, inc., the grids of the electric valves 16 and 17, 18 and 19, etc., are connected to their respective cathodes through current limiting resistors 26, negative bias batteries 27, and opposite halves of the secondary windings of grid transformers 28, 29, 30 and 31, respectively. In order to periodically transfer the current between the terminals of the phase windings 13 and 14, the primary windings of the grid transformers 28, 29, 30 and 31 are excited with the potentials across the resistors 32, 33, 34 and 35, respectively, which in turn are energized from the appropriate phase of the turbo-generator 11 through the brushes of the distributor discs 36 and 37 driven by the rotor 15 of the motor 10. In case it is desired to vary the voltage impressed upon the armature windings 13 and 14 this may be accomplished by means of a rotary phase shifting transformer 38 included between the turbo-generator 11 and the control resistors 32–35, inc., as is well understood by those skilled in the art. However, this feature of controlling the conductivity of a group of electric valves by a distributor mechanism driven by a motor energized through the valves forms no part of my present invention, but is disclosed and broadly claimed in my copending application, Serial No. 638,361, filed May 11, 1923, and assigned to the same assignee as the present application.

In explaining the operation of the above-described apparatus, it will be assumed that, initially, the switch device 25 is in its lower position, that the prime mover element of the turbo-generator 11 is supplying energy to the generator which is generating a relatively high frequency alternating current of, say, 300 cycles, and that the rotating field 15 of the motor 10 is in approximately the position illustrated. It will also be assumed that the rotary phase shifting transformer 13 is adjusted so that the phase of the alternating potentials impressed upon the grids of the electric valves 16–23, inc., will be retarded with respect to the anode potentials of these valves to reduce the average voltage impressed upon the armature windings 13 and 14, as is well understood by those skilled in the art. Under the assumed conditions, it will be noted that the resistors 33 and 35 are energized through their associated brushes of the discs 36 and 37 from the appropriate phase windings of the rotary phase shifting transformer 38 so that the primary windings of the grid transformers 29 and 31 are excited with alternating potentials of the frequency of the turbo-generator 11 to render conducive the pairs of electric valves 18 and 19 and 22 and 23 against the negative bias included in their grid circuits. These valves now act as controlled rectifiers supplying unidirectional current to a load circuit which comprises the lower portion of the armature winding 13, the switch 25, the unidirectional current circuit 24, the rotating field winding 15, and the right-hand portion of the phase winding 14, the current returning through the electric valves 22 and 23 to the other phase of the turbo-generator 11.

It will be assumed that, with these portions of the armature windings 13 and 14 energized, their magnetomotive force will produce a torque upon the rotating member 15 to accelerate it in the direction indicated by the arrow. When the motor has turned through substantially ninety mechanical degrees (assuming a two-pole motor) the energizing circuit for the resistor 35 is broken through its cooperating brush, while the resistor 34 becomes energized through its brush to excite the primary winding of the grid transformer 30 and transfer the load current from the right-hand portion of the armature winding 14 to the left-hand portion of this winding, advancing the phase of the magnetomotive force of the motor 10 by ninety electrical degrees, so that the rotor 15 is again in approximately maximum torque producing position with respect to the motor magnetomotive force. In this manner, the current is successively transferred between the several terminals of the armature windings 13 and 14 to produce a rotation of the magnetomotive force of the motor and thus, of the rotating member 15. With this arrangement, it will be noted that under any conditions current is supplied only to those armature windings, which are in torque producing position with respect to the rotor and the motor will accelerate at a rate dependent upon the connected load. Such a motor system is, in principle, a direct current series motor with four commutator segments, although structurally, it is an alternating current synchronous motor. The particular speed torque characteristics of the motor may be varied by adjusting the rotary phase shifting transformer 38 to vary the average voltage impressed upon the armature windings 13 and 14, as is well understood by those skilled in the art.

Under certain conditions, it may be desirable to operate the above-described motor system from a source of direct current, as for example, when the system is employed on an electric traction unit which may enter an electrified zone of a metropolitan terminal. Operation under these conditions may be obtained by throwing the switch 25 to its upper position in which case the direct current supply circuit 12 is connected in the unidirectional current circuit of the motor; that is, the circuit interconnecting the electrical neutrals of the windings 13 and 14 and including the rotating field winding 15. Under these conditions, the generator of the unit 11 may be either disconnected from the prime mover, from which it is normally driven, or the whole unit may be left floating on the line, the generator acting as a synchronous condenser for fixing the wave form on the high frequency circuit and supplying a commutating electromotive force for the several electric valves 16–23, inc. The turbogenerator 11 and the several electric valves now act as a combined inverter and frequency changer. If it is desired to fix the frequency of the high frequency circuit when energy is drawn from the trolley circuit, the phase shifting transformer 38 may be energized from an independent auxiliary generator. The operation of the system as a whole is similar to that described above with the exception that the energy is introduced in the unidirectional current circuit of the motor rather than from the high frequency alternating current circuit.

Figure 2:
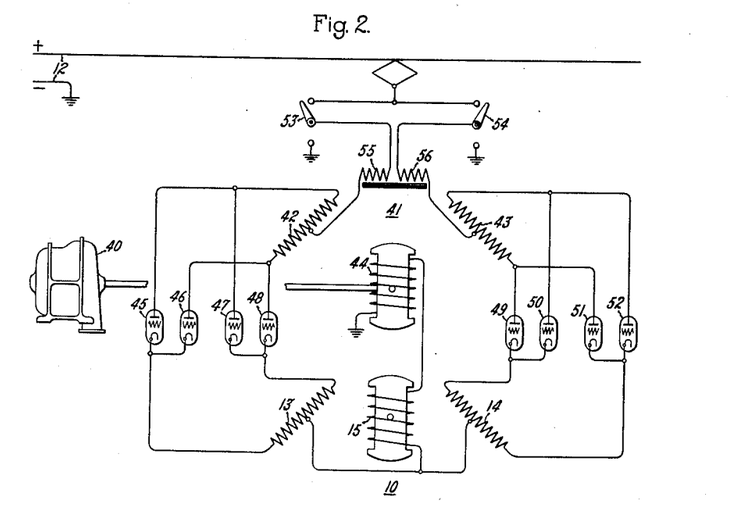
Fig. 2 shows a modification of the arrangement of Fig. 1 in which the direct current source is introduced in the unidirectional current circuit of the generator.

In Fig. 2 is shown a modification of the arrangement of Fig. 1 which permits of series excitation of both the high frequency alternating current generator and the variable speed alternating current motor. In the arrangement of this figure the motor 10 is similar to that of Fig. 1, while the turbo-generator unit 11 of Fig. 1 comprises a prime mover 40 and a high frequency alternating current generator 41 provided with two bi-phase windings 42 and 43 and a rotatable field or exciting winding 44. The generator armature winding 42 is connected to supply current to the phase winding 13 of the motor 10 through two pairs of electric valves 45 and 46, and 47 and 48. In this case also, the generator armature winding 43 is connected to supply current to the terminals of the phase winding 14 through two pairs of electric valves 49 and 50 and 51 and 52, it being noted that in this case current flows into the armature windings 13 and 14 in the same direction rather than into one winding and out the other as in the arrangement of Fig. 1. The unidirectional current supplied to the terminals of the armature windings 13 and 14 emerges from the neutrals of these windings and combines, flowing in series through the rotatable field winding 15 of the motor 10 and the field winding 44 of the generator 41, the circuit being completed, as illustrated, through ground and through switches 53 and 54, in their lower positions, mutually coupled reactors 55 and 56, respectively, and the electrical neutrals of the windings 42 and 43. The switches 53 and 54 are double throw switches and in their upper positions similarly complete the unidirectional current circuit with the exception that the direct current trolley circuit 12 is included in series with the above described valve converting circuits. It will be understood that a grid control arrangement similar to that illustrated and described in connection with Fig. 1 or any other well known grid control arrangement may be employed in the system of Fig. 2, the grid control circuit being omitted in this case for the sake of simplicity.

The operation of the system illustrated in Fig. 2 is similar to that of Fig. 1. In brief, the armature winding 42, together with the pairs of electric valves 45 and 46, and 47 and 48, supply rectified high frequency current successively to the terminals of the armature winding 13 of the motor 10, the transfer of current between the terminals of the winding 13 being effected in accordance with the speed of rotation of the motor. Similarly, the armature winding 43 of the generator 41 and electric valves 49 and 50, and 51 and 52, operate to supply rectified high frequency current to the terminals of the phase winding 14 of the motor 10. These two currents flow in the form of unidirectional current through the common neutral circuit and through the rotating field windings 15 and 44, the circuit being completed through ground, the switches 53 and 54 in their lower positions, and mutually coupled reactors 55 and 56. In case it is desired to energize such a system from an auxiliary direct current supply circuit, as when such a system is utilized on a traction unit operating in an electrified zone, switches 53 and 54 are thrown to their upper positions, thus introducing the direct current trolley circuit 12 in the unidirectional current circuit of each of the two converting apparatus. As before, the generator 41 is preferably left floating on the line and thus operates as a synchronous condenser determining the frequency of the high frequency alternating current circuit and supplying a source of commutating electromotive force for the several electric valves, which under these conditions operate also as inverting valves.

Figure 3:
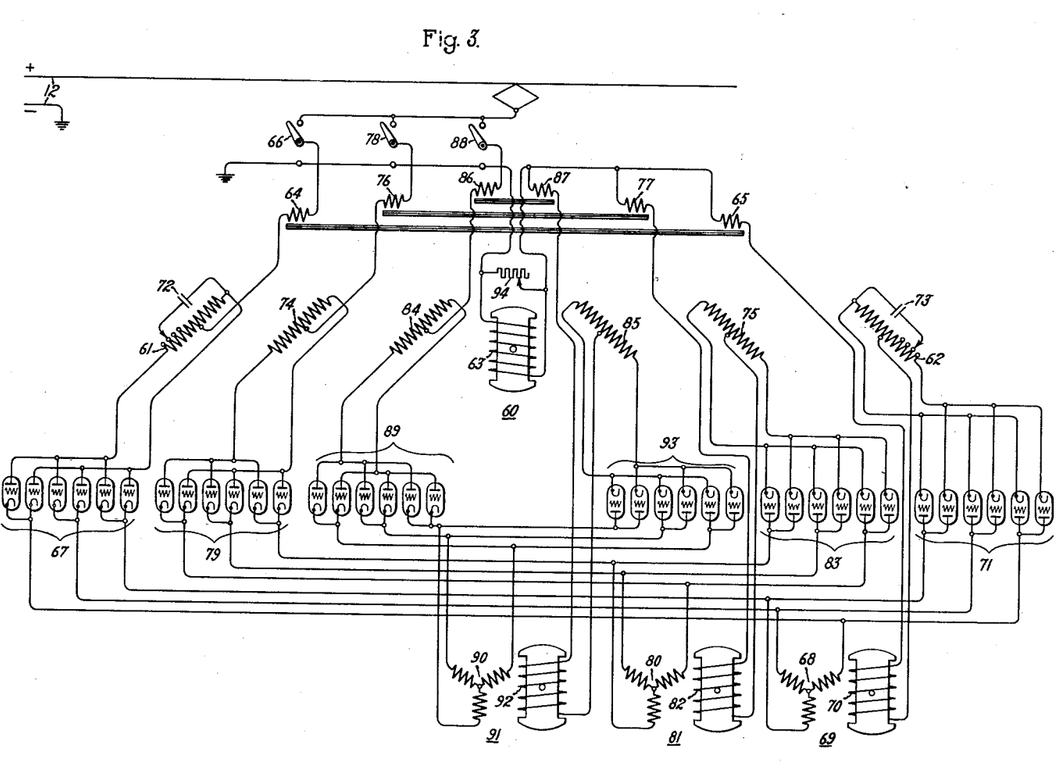
Figure 4:
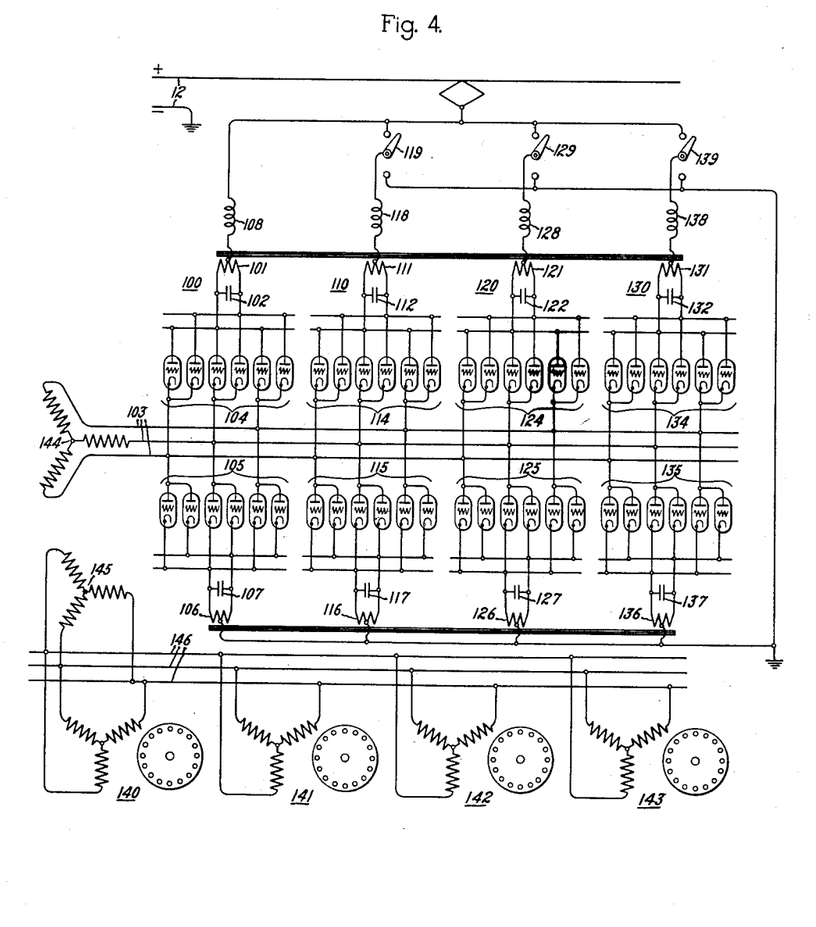
Fig. 4 shows a still further modification in which the commutating electromotive force for the electric valve converting apparatus is obtained from tuned resonant circuits, rather than from synchronous machinery, as in the previous figures.

Figs. 3 and 4 of the drawings illustrate electric valve converting systems of the type shown in Figs. 1 and 2 by means of which one or more alternating current motors may be more satisfactorily started from rest when the system is energized from a source of direct current. In Fig. 3, for example, the turbo-generator 40—41 of Fig. 2 is replaced by a quarter phase synchronous dynamo-electric machine 60 which may be either a turbo-generator or a synchronous condenser, that is, a machine not driven by an independent prime mover, the latter case being the one assumed for the purposes of explanation of the operation of the system from the direct current supply circuit 12. The machine 60 comprises a pair of bi-phase windings 61 and 62 and a rotating field winding 63 interconnected between the electrical neutrals of the windings 61 and 62 through the mutually coupled reactors 64 and 65 and a double throw switch member 66, when in its lower position. The winding 61 together with a group of electric valves 67 operates as an inverter, while the electric valves 67 operate also as frequency changing valves, transmitting current to the armature winding 68 of a synchronous motor 69. This current is returned to the winding 62 through a group of electric valves 71, the circuit being completed through the mutually coupled reactors 64 and 65, the field winding 63 of the machine 60, and the switch 66, as described above. If it is desired to give the motor 69 series characteristics, its rotating field winding 70 may also be included in the unidirectional current circuit, as by connecting it as illustrated between the electrical neutral of the winding 62 and the reactor 65.

Commutation under starting conditions, before the machine 60 has reached an operating speed corresponding to high frequency alternating current in the windings 61 and 62, may be effected by connecting the commutating capacitors 72 and 73 across the windings 61 and 62, respectively, and still further flexibility may be obtained by providing the windings 61 and 62 with variable voltage taps, and connecting the condensers 72 and 73 across variable portions of their associated windings, as illustrated.

The generator 60 is also provided with additional bi-phase windings 74 and 75 inductively coupled to the windings 61 and 62, respectively, which, together with the mutually coupled reactors 76 and 77, a switch 78, a group of electric valves 79, a motor 81 comprising an armature winding 80 and a field winding 82, and a group of electric valves 83, may be connected similarly to the apparatus described above to form a separate electric valve converting apparatus. This second apparatus is completely independent of the first apparatus, save for the inductive couplings between the phase windings of the machine 60. Similarly, the synchronous machine 60 may be provided with additional bi-phase armature windings 84 and 85, which, together with mutually coupled reactors 86 and 87, switch 88, a group of electric valves 89, the armature winding 90 of a motor 91 provided with field winding 92, and a group of electric valves 93 is similarly connected to form a second independent electric valve converting apparatus. It is apparent that as many additional independent valve converting apparatus may be provided as is necessary to satisfy the operaing requirements of the system. An adjustable resistor 94 may be connected across the field winding 63 to vary the excitation characteristics of the machine 60, if desired.

The grid circuits of the several groups of electric valves have been omitted for the sake of simplicity, but it will be understood that the grids of the groups of electric valves 67 and 71 cooperating with the motor 91 will be controlled by a distributor driven by the motor 91, the source of control potential being derived from auxiliary windings of the machine 60 or from a separate pilot generator, as is well understood by those skilled in the art. Similarly, the grids of electric valves associated with the motor 81 will be controlled by a distributor driven by that motor, etc. While in the system illustrated each of the separate converting apparatus is connected to supply a separate load circuit, that is, an individual synchronous motor such as might be employed in an electric locomotive or other traction unit, it will be apparent that all of these converting apparatus may be connected to supply a common load circuit, as for example, is illustrated in Fig. 4 of the drawings.

In explaining the operation of the above described apparatus, it will be assumed that the switch member 66 is closed in its upper position, and that switch members 78 and 88 are closed in their lower positions. Under these conditions, direct current energy is supplied to the inverting-frequency changing apparatus comprising the phase winding 61 of the machine 60, the group of electric valves 67, the armature winding 68 of the motor 69, the group of electric valves 71 and the phase winding 62 of the machine 60. The commutating capacitor 72 will be effective to commutate the current between the valves of the group 67 associated with the terminals of the windings 61. Since there is no mechanical load on the machine 60, it will accelerate to synchronous speed, corresponding to a high frequency alternating current in its armature winding, within a relatively short interval of time. On the other hand, the distributor associated with the motor 69 will be effective to transfer the current from the group of valves 67 between its several phase terminals, and similarly to transfer this current between the valves of the group 71 associated with its several phase terminals to return this current to the winding 62. Similarly, the capacitor 73 will be effective to commutate the current between the valves of the group 71 associated with the terminals of the winding 62. In this way, energy will be supplied to the variable speed motor 69 to accelerate its connected load, for example, the traction unit.

The full energy of the system will not, however, be consumed in the above described circuit, which, because it is operating at full line voltage, might draw an excessive in-rush current. However, the windings 74 and 84 coupled to the winding 61 and the windings 75 and 85 coupled to the winding 62 act as secondary transformer windings, drawing energy from the windings 61 and 62, and through their associated groups of electric valves, and similarly supplying energy to the armature windings of the motors 81 and 91, respectively. In this manner, the energy drawn from the direct current circuit is effectively distributed, one-third to each of the motors 69, 81, and 91, enabling them to start satisfactorily directly from the trolley circuit 12. If it is desired to increase the energization of the motors 69, 81 and 91, the switches 78 and 88 may be selectively operated to include the direct current circuit 12 in the unidirectional current circuit of the converting apparatus supplying the motors 81 and 91. With all three switches 66, 78 and 88 in their upper positions, the several converting apparatus are supplied in parallel from the direct current circuit 12 and maximum energy is supplied to the motors.

In Fig. 4 there is shown a modification of the arrangement of Fig. 3 in which the direct current is converted into intermediate high frequency alternating current in one or more resonant oscillating circuits rather than by an inverting apparatus including a synchronous dynamo-electric machine, and in which the outputs of the several independent converting apparatus are connected through an output transformer to a common load circuit from which is energized a plurality of motors. However, it will be understood that this arrangement is also suitable for energizing a plurality of separate load circuits, one from each of the converting apparatus as shown in Fig. 3 of the drawings. The system of Fig. 4 comprises an electric valve converting apparatus 100 including an oscillating circuit made up of a mid-tapped reactor 101 and a parallel connected capacitor 102. The output terminals of the oscillating circuit 101—102 are connected to transmit current to an alternating current load circuit 103 through a group of electric valves 104, while the current transmitted to the load circuit 103 is returned through a second group of electric valves 105 and a second oscillating circuit made up of a mid-tapped reactor 106 and a parallel connected capacitor 107. The electrical midpoints of the reactors 101 and 106 are interconnected through a unidirectional current circuit including a smoothing reactor 108, the direct current trolley circuit 12, and ground.

The system also includes a plurality of independent electric valve converting apparatus 110, 120 and 130, comprising similar circuit elements referred to in the drawings by numbers ending in the same digits. In addition, these converting apparatus 110, 120 and 130 include the switching devices 119, 129 and 139, respectively, in their unidirectional current circuit for selectively short circuiting the unidirectional current circuit or connecting the direct current trolley circuit 12 therein. The several electric valve converting apparatus are independent except for the fact that their high frequency alternating current circuits are coupled, as for example, by mounting the reactors 101, 111, 121, and 131 on a single core, and the reactors 106, 116, 126 and 136 on a single core, although if desired, all of these reactors may be wound on a single magnetic core structure. The alternating current circuit 103 is connected to supply a plurality of motors, which may be either of the synchronous or induction type, although by way of example I have illustrated the induction motors 140, 141, 142 and 143, through an output transformer comprising a polyphase primary network 144 connected to the circuit 103 and a secondary network 145 connected to a secondary bus 146. The grid circuits have been omitted in Fig. 4 for the sake of simplicity, although it will be understood that the grids of the several valves are to be excited, as in the system of Fig. 1, with a component of high frequency alternating potential, which may be derived from one of the oscillating circuits, and with a low frequency component, which may be obtained from a commutator driven by an independent pilot motor.

The operation of the last described apparatus is similar to that of the system illustrated in Fig. 3. Under starting conditions, the switch devices 119, 129 and 139 are connected to their lower positions so that the direct current trolley circuit 12 is included in the unidirectional current circuit of only the valve converting apparatus 100. This converting apparatus operates as a combined electric valve inverter and frequency changing apparatus as in the valve converting apparatus of Fig. 3, the electric valves being associated with each terminal of the oscillating circuits 101—102 and 106—107 being excited at a relatively high frequency to transfer the current therebetween at this high frequency, the commutation at this frequency being effected by the capacitors 102 and 107. By properly selecting the constants of the reactor 101 and capacitor 102, and reactor 106 and capcitor 107, the operation of this apparatus may be that of substantially a pure oscillator generating a substantially sinusoidal alternating current or that of an ordinary inverter in which the alternating current is substantially rectangular in wave form, the commutation being forced by the commutating capcitor. At the same time, the grids of the valves associated with the several terminals of the alternating current circuit 103 are excited at the frequency which it is desired to supply to this circuit, as for example by a distributor driven by an auxiliary variable speed motor. In this manner, alternating current of any desired frequency is supplied to the circuit 103 which is effective to operate the motors 140-143, inc., the speed of the motors, obviously, being dependent upon the applied frequency.

Under the conditions just described, the maximum energy of the system is not consumed in the valve converting apparatus 100, because of the fact the oscillating circuits of this converting apparatus are loaded through inductive coupling with the converting apparatus 110, 120 and 130. These apparatus, with their switches 119, 129 and 139 in their lower positions, are not independently supplied with energy from the direct current trolley circuit 12, but derive their energy from their coupling with the converting apparatus 100. In this manner, the total energy drawn from the trolley circuit 12 under starting conditions, will be approximately only one quarter of the full capacity of the apparatus so that the system as a whole may be started directly across the trolley circuit. When it is desired to increase the energization of the system, as for example, for accelerating the traction unit of which it may form a part, switches 119, 129 and 139 may be selectively thrown to their upper positions in which the direct current trolley circuit is included in the unidirectional current circuits of the converting apparatus 110, 120 and 130, respectively.

While I have described what I at present consider the preferred embodiments of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. An electric valve converting system comprising a substantially constant frequency alternating current circuit, a variable frequency alternating current translating apparatus, a plurality of electric valves interconnecting said circuit and said apparatus, said system including a unidirectional current circuit, means for controlling the conductivity of said valves to control the current transmitted between said circuit and said apparatus, a source of direct current, and means for connecting said direct current source in the unidirectional current circuit of the system for supplying energy thereto.

2. An electric valve converting system comprising a substantially constant frequency alternating current translating apparatus, a variable frequency alternating current translating apparatus, one of said apparatus being a polyphase apparatus including a pair of inductive networks each provided with an electrical neutral, a plurality of electric valves connected to transmit current from one of said networks to the other translating apparatus, a plurality of other electric valves connected to return the current from said other translating apparatus to the other of said networks, a unidirectional current circuit interconnecting the neutrals of said networks, means for controlling the conductivity of said valves, a source of direct current, and means for connecting said source in series with the unidirectional current circuit of the system.

3. An electric valve converting system comprising an alternating current supply circuit, a variable frequency alternating current translating apparatus, a plurality of electric valves interconnecting said circuit and said apparatus, said system including a unidirectional current circuit, means for controlling the conductivity of said valves to control the current transmitted between said circuit and said apparatus, a source of direct current, and means for connecting said direct current source in series with the unidirectional current circuit of the system to supplement said alternating current supply circuit in supplying energy to said translating apparatus.

4. An electric valve converting system comprising a substantially constant frequency alternating current circuit, a variable frequency alternating current load circuit, a plurality of groups of grid controlled electric valves, each group interconnecting a terminal of the load circuit with the several terminals of said constant frequency circuit, said system including a unidirectional current circuit, a source of grid excitation for said valves, and a mechanical distributor, driven synchronously with said load circuit, for successively exciting the grids of said groups of valves to transfer the current between the terminals of said load circuit, a source of direct current, and means for connecting said source of direct current in the unidirectional current circuit of the system to supply energy to said load circuit.

5. An electric valve converting system comprising an alternating current supply circuit, an electric translating apparatus including a plurality of phase windings, electric valve means for transmitting current from said supply circuit to one of said windings, a unidirectional current circuit interconnecting said windings, electric valve means for returning said current from another of said windings to said supply circuit, means for controlling the conductivity of said valve means, an auxiliary source of direct current, and means for connecting said direct current source in the unidirectional current circuit of said system to supply energy to said translating apparatus.

6. An electric valve converting system comprising an alternating current supply circuit, a polyphase electric translating apparatus including a pair of inductive networks each provided with an electrical neutral, a plurality of electric valves connected to transmit current from said supply circuit to one of said networks, a unidirectional current circuit interconnecting said neutrals, a plurality of other electric valves connected to return said current from the other of said networks to said supply circuit, means for controlling the conductivity of said valves, an auxiliary source of direct current, and means for connecting said direct current source in the unidirectional current circuit of said system to supply energy to said translating apparatus when said alternating current circuit is deenergized.

7. An electric valve converting system comprising a synchronous generator, an alternating current motor provided with a plurality of phase windings, a plurality of electric valves connected to transmit current from said generator to one of said phase windings, a unidirectional current circuit interconnecting said windings, a plurality of other electric valves connected to return said current from another of said windings to said generator, means for controlling the conductivity of said valves, an auxiliary source of direct current, and means for connecting said direct current source in the unidirectional current circuit of said system, under which conditions said generator serves as a source of commutating electromotive force.

8. An electric valve traction system comprising a prime mover and associated alternating current generator for mounting on a traction unit, a traction motor provided with a plurality of phase windings, electric valve means connected to transmit current from said generator to one of said phase windings, a unidirectional current circuit interconnecting said windings, electric valve means connected to return said current from another of said windings to said generator, means for controlling the conductivity of said valve means, a direct current trolley circuit, and means for connecting said trolley circuit in the unidirectional current circuit of the motor to supply energy to said system when the traction unit is within a trolley zone.

9. The method of operating an electric valve system in which an alternating current translating apparatus is connected to an alternating current circuit through an electric valve converting apparatus, said system including a unidirectional current circuit, which comprises normally supplying energy to said translating apparatus from said alternating current circuit through said converting apparatus and, when a source of direct current is available, supplying direct current energy to the unidirectional current circuit of said system.

10. The method of operating an electric valve system in which an alternating current translating apparatus is connected to an alternating current generator through an electric valve converting apparatus, said system including a unidirectional current circuit and said generator being normally driven by a prime mover, which comprises normally supplying energy to said translating apparatus from said alternating current circuit through said converting apparatus and, when a source of direct current is available, supplying direct current energy to the unidirectional current circuit of said system and deenergizing said prime mover, whereby said generator floats on the line and supplies commutating electromotive force for said converting apparatus.

11. An electric valve converting system comprising an alternating current generator provided with a plurality of phase windings each provided with an electrical neutral, a unidirectional current circuit interconnecting said neutrals, an electric translating apparatus, a plurality of electric valves connected to transmit current from one of said phase windings to said translating apparatus, a plurality of other electric valves connected to return said current from said translating apparatus to the other of said phase windings, means for controlling the conductivity of said valves, an auxiliary source of direct current, and means for connecting said direct current source in the unidirectional current circuit of said generator to supply energy to said translating apparatus.

12. An electric valve converting system comprising a source of direct current, a first electric valve converting apparatus for converting said direct current into relatively high frequency alternating current and reconverting said high frequency current into relatively low frequency alternating current, a load circuit energized with said low frequency current, a second electric valve converting apparatus connected similarly to said first converting apparatus, said second converting apparatus having its high frequency alternating current circuit coupled to that of said first converting apparatus and including a unidirectional current circuit, and means for selectively excluding or including said direct current source in said unidirectional current circuit, whereby said second converting apparatus may receive energy from its coupling with said first converting apparatus or directly from said source.

13. The method of transmitting energy from a source of direct current to an electric translating apparatus through a plurality of electric valve converting apparatus including mutually coupled alternating current circuits and independent unidirectional current circuits which comprises transmitting energy from said source to said translating apparatus through one of said converting apparatus and simultaneously transmitting energy to said translating apparatus through the inductive coupling of said apparatus and the other of said converting apparatus under certain load conditions, and under other load conditions supplying energy from said source directly to the unidirectional current circuits of both of said converting apparatus.

14. An electric valve converting system comprising a polyphase synchronous dynamo-electric machine provided with a plurality of inductively coupled windings for each phase, said windings being connected to form a plurality of pairs of inductive networks each having an electrical neutral, a unidirectional current circuit interconnecting the neutrals of each pair of networks, electric translating apparatus, a plurality of groups of electric valves, each group being connected to transmit current from one network of a pair to said translating apparatus, a plurality of other groups of electric valves, each group being connected to return said current to the other network of said pair, means for controlling the conductivity of said valves, a source of direct current, and means for selectively introducing said direct current source into one or more of said unidirectional current circuits.

15. An electric valve converting system comprising a polyphase synchronous dynamo-electric machine provided with a field winding and a plurality of inductively coupled windings for each phase, said phase windings being connected to form a plurality of pairs of inductive networks each having an electrical neutral, a unidirectional current circuit interconnecting the neutrals of each pair of networks, said unidirectional current circuits having a common portion including said field winding, electric translating apparatus, said second converting apparatus having its high frequency alternating current circuit coupled to that of said first converting apparatus and including a unidirectional current circuit, and means for selectively excluding or including said direct current source in said unidirectional current circuit, whereby said second converting apparatus may receive energy from its coupling with said first converting apparatus or directly from said source.

16. An electric valve converting system comprising a polyphase synchronous dynamo-electric machine provided with a field winding and a plurality of inductively coupled windings for each phase, said phase windings being connected to form a plurality of pairs of inductive networks each having an electrical neutral, a unidirectional current circuit interconnecting the neutrals of each pair of networks, said unidirectional current circuits having a common portion including said field winding, a pair of mutually coupled reactors connected in each of said unidirectional current circuits on opposite sides of said common portion, electric translating apparatus, said second converting apparatus having its high frequency alternating current circuit coupled to that of said first converting apparatus and including a unidirectional current circuit, and means for selectively excluding or including said direct current source in said unidirectional current circuit, whereby said second converting apparatus may receive energy from its coupling with said first converting apparatus or directly from said source.

17. An electric valve converting system comprising a polyphase synchronous dynamo-electric machine provided with a plurality of inductively coupled windings for each phase, said windings being connected to form a plurality of pairs of inductive networks each having an electrical neutral, a unidirectional current circuit interconnecting the neutrals of each pair of networks, a plurality of alternating current motors, a plurality of groups of electric valves, each group being connected to transmit current from one network of a pair to one of said motors, a plurality of other groups of electric valves, each group being connected to return said current to the other network of said pair, means for controlling the conductivity of said valves, a source of direct current, and means for selectively introducing said direct current source into one or more of said unidirectional circuits.

18. An electric valve converting system comprising a polyphase synchronous dynamo-electric machine provided with a field winding and a plurality of inductively coupled windings for each phase, said phase windings being connected to form a plurality of pairs of inductive networks each having an electrical neutral, a unidirectional current circuit interconnecting the neutrals of each pair of networks, said unidirectional current circuits having a common portion including said field winding, a plurality of synchronous motors each provided with a field winding, a plurality of groups of electric valves, each group being connected to transmit current from one network of a pair to one of said motors, a plurality of other groups of electric valves, each group being connected to return said current to the other network of said pair, the field winding of said motor being connected in the unidirectional current circuit of the pair of networks from which the motor is energized, a source of direct current, and means for selectively introducing said direct current source into one or more of said unidirectional circuits.

19. An electric valve converting system comprising a polyphase synchronous dynamo-electric machine provided with a plurality of inductively coupled windings for each phase, said windings being connected to form a plurality of pairs of inductive networks each having an electrical neutral, a unidirectional current circuit interconnecting the neutrals of each pair of networks, electric translating apparatus, a plurality of groups of electric valves, each group being connected to transmit current from one network of a pair to said translating apparatus, a plurality of other groups of electric valves, each group being connected to return said current to the other network of said pair, means for controlling the conductivity of said valves, commutating capacitors connected across the windings of each of one of said pairs of networks, a source of direct current, and means for selectively introducing said direct current source into one or more of said unidirectional current circuits.

20. An electric valve converting system comprising a source of direct current, a relatively high frequency oscillation circuit energized from said source, a relatively low frequency load circuit, an electric valve frequency changing apparatus for transmitting the output of said oscillation circuit to said load circuit, a second oscillation circuit and associated electric valve frequency changing apparatus connected to said load circuit, said oscillation circuits having mutually coupled alternating current circuits and said second oscillation circuit having an independent unidirectional current circuit, and means for selectively excluding or including said direct current source in said unidirectional current circuit, whereby said second oscillation circuit may receive energy from its coupling with said first oscillation circuit or directly from said source.

21. An electric valve converting system comprising a source of direct current, a relatively high frequency resonant circuit including a capacitor and a parallel connected reactor having an electrical midpoint connected to one side of said source, an alternating current load circuit, a group of electric valves interconnecting each terminal of said oscillation circuit with the several terminals of said load circuit, a connection from said load circuit to the other side of said source, means for controlling the conductivity of said valves to transfer the current between the groups of valves at substantially the natural frequency of said resonant circuit and to transfer the current between the valves of each group at the frequency of said load circuit, a second resonant circuit similar to said first and having a reactor inductively coupled to the reactor of said first resonant circuit, other groups of electric valves, similarly controlled and similarly interconnecting said second resonant circuit and said load circuit, the interconnections including a unidirectional current circuit, and means for selectively excluding or including said direct current source in said unidirectional current circuit, whereby said second resonant circuit may receive energy from its coupling with said first oscillation circuit or directly from said source.

ERNST F. W. ALEXANDERSON.